United States Patent
Krishnamoorthy et al.

(10) Patent No.: US 11,386,797 B2
(45) Date of Patent: Jul. 12, 2022

(54) SYSTEM FOR GENERATION OF DATA CONTENT BASED ON LEARNING REINFORCEMENT

(71) Applicant: Bank of America Corporation, Charlotte, NC (US)

(72) Inventors: Madhusudhanan Krishnamoorthy, Hasthinapuram (IN); Vinothkumar Babu, Chennai (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 359 days.

(21) Appl. No.: 16/821,705

(22) Filed: Mar. 17, 2020

(65) Prior Publication Data
US 2021/0295726 A1 Sep. 23, 2021

(51) Int. Cl.
| | |
|---|---|
| *H04H 60/33* | (2008.01) |
| *G09B 5/06* | (2006.01) |
| *G06N 20/00* | (2019.01) |
| *H04N 21/8545* | (2011.01) |
| *H04N 21/234* | (2011.01) |
| *H04N 21/2343* | (2011.01) |

(52) U.S. Cl.
CPC .......... *G09B 5/065* (2013.01); *G06N 20/00* (2019.01); *H04N 21/234* (2013.01); *H04N 21/2343* (2013.01); *H04N 21/8545* (2013.01)

(58) Field of Classification Search
CPC ...... G09B 5/065; G06N 20/00; H04N 21/234; H04N 21/2343; H04N 21/8545
See application file for complete search history.

(56) References Cited

U.S. PATENT DOCUMENTS

| | | | | |
|---|---|---|---|---|
| 2019/0222895 | A1* | 7/2019 | Petander | H04N 21/812 |
| 2020/0124429 | A1* | 4/2020 | Zhang | G01C 21/3415 |
| 2021/0142387 | A1* | 5/2021 | Gupta | G06Q 30/0255 |

OTHER PUBLICATIONS

Danfei Xu et al.; Neural Task Programming Learning to Generalize Across Hierarchical Tasks, Feb. 22, 2020, 8 pages.
De-An Huang et al.; Neural Task Graphs: Generalizing to Unseen Tasks from a Single Video Demonstration; Mar. 6, 2019; Computer Science Department, Stanford University; 10 pages.

* cited by examiner

*Primary Examiner* — Kyu Chae
(74) *Attorney, Agent, or Firm* — Moore & Van Allen PLLC; Anup Shrinivasan Iyer

(57) ABSTRACT

Systems, computer program products, and methods are described herein for generation of data content based on learning reinforcement. The present invention is configured to receive a video file demonstrating regulatory compliance requirements; display the video file in one or more interactive application environments stored thereon; initiate a reinforcement learning algorithm on the video file; initiate an optimization policy generation engine on the user inputs to generate an optimization policy, wherein the optimization policy generation engine is configured to encode the one or more user inputs into shaping rewards; initiate an implementation of the optimization policy on the video file to generate a modified video file based on at least the optimization policy; initiate a validation engine on the modified video file to validate one or more changes implemented on the video file; and initiate a deployment of the modified video file to the one or more users.

20 Claims, 3 Drawing Sheets

SYSTEM FOR GENERATION OF DATA CONTENT BASED ON LEARNING REINFORCEMENT

FIELD OF THE INVENTION

The present invention embraces a system for generation of data content based on learning reinforcement.

BACKGROUND

A virtual learning environment (VLE) in educational technology is a web-based platform for the digital aspects of courses of study, usually within educational institutions. They present resources, activities and interactions within a course structure and provide for the different stages of assessment. VLE's have expanded significantly in recent years. The traditional virtual learning sessions tend to be static in nature and do not have the adaptability and intelligence to convey substantive information based on a user's personal learning need.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for generation of data content based on learning reinforcement is presented. The system comprising: at least one non-transitory storage device; and at least one processing device coupled to the at least one non-transitory storage device, wherein the at least one processing device is configured to: electronically receive, from a video file repository, a video file demonstrating regulatory compliance requirements for one or more users associated with a resource distribution entity, wherein the video file comprises one or more image frames; transmit control signals configured to cause one or more computing devices of one or more users to display the video file in one or more interactive application environments stored thereon; initiate, via the one or more interactive application environments, a reinforcement learning algorithm on the video file, wherein implementing further comprises electronically receiving, via the one or more interactive application environments, one or more user inputs from the one or more users providing feedback for at least one or more portions of the video file; initiate an optimization policy generation engine on the one or more user inputs to generate an optimization policy, wherein the optimization policy generation engine is configured to encode the one or more user inputs into shaping rewards, wherein encoding further comprises assigning a cost to a first portion of one or more image frames associated with one or more negative feedbacks and assigning a reward to a second portion of the one or more image frames associated with one or more positive feedbacks, wherein the first portion and the second portion are associated with at least the one or more portions of the video file; initiate an implementation of the optimization policy on the video file, wherein initiating further comprises generating a modified video file based on at least the optimization policy to maximize an aggregated reward calculated based on the one or more positive feedbacks; initiate a validation engine on the modified video file, wherein the validation engine is configured to validate one or more changes implemented on the video file with the one or more user inputs and the optimization policy; and initiate a deployment of the modified video file to the one or more users.

In some embodiments, the at least one processing device is further configured to: electronically receive, from a user module, user characteristics associated with the one or more users, wherein the user characteristics comprises at least information associated with one or more computing devices of the or more users, information associated with one or more agencies associated with the one or more users, and information associated with regulatory compliance requirements for the one or more agencies; and categorize the one or more users based on at least the user characteristics.

In some embodiments, the at least one processing device is further configured to: electronically receive the one or more user inputs from the one or more users providing feedback for the at least one or more portions of the video file, wherein the one or more user inputs comprises a feedback associated with a quality of the video file and a feedback associated with a substantive content of the video file.

In some embodiments, the feedback associated with the quality of the video file comprises at least a video resolution, a frame rate, an aspect ratio, video color model and depth, and/or video display parameters.

In some embodiments, the feedback associated with the substantive content of the video file comprises at least an indication whether the regulatory compliance requirements demonstrated in the video file are relevant to the one or more agencies associated with the one or more users, wherein the regulatory compliance requirements comprises at least applicable laws, regulations, guidelines, and/or specifications specific to each of the one or more agencies.

In some embodiments, the at least one processing device is further configured to: electronically record, via the one or more interactive application environments, one or more user interactions with the video file, wherein the one or more user interactions comprises at least rewind, fast-forward, skip, re-watch, sped-up, slowed-down, and/or the like.

In some embodiments, the at least one processing device is further configured to initiate an implementation of the optimization policy on the video file, wherein initiating further comprises: initiating a video frame splitter algorithm on the video file; retrieving, using the video frame splitter algorithm, the first portion of the one or more image frames from one or more positions on a timeline of the video file; mapping the optimization policy to one or more actions to be executed on the one or more image frames; initiating an execution of the one or more actions on the one or more image frames to generate one or more modified image frames; interleaving the one or more modified image frames into the one or more positions on the timeline of the video file; and generating the modified video file based on at least interleaving the one or more modified image frames into the one or more positions on the timeline of the video file.

In another aspect, a method for generation of data content based on learning reinforcement is presented. The method comprising: electronically receiving, from a video file repository, a video file demonstrating regulatory compliance requirements for one or more users associated with a resource distribution entity, wherein the video file comprises one or more image frames; transmitting control signals configured to cause one or more computing devices of one or more users to display the video file in one or more interactive application environments stored thereon; initiating, via the one or more interactive application environments, a reinforcement learning algorithm on the video file, wherein implementing further comprises electronically receiving, via the one or more interactive application environments, one or more user inputs from the one or more users providing feedback for at least one or more portions of the video file; initiating an optimization policy generation engine on the one or more user inputs to generate an optimization policy, wherein the optimization policy generation engine is configured to encode the one or more user inputs into shaping rewards, wherein encoding further comprises assigning a cost to a first portion of one or more image frames associated with one or more negative feedbacks and assigning a reward to a second portion of the one or more image frames associated with one or more positive feedbacks, wherein the first portion and the second portion are associated with at least the one or more portions of the video file; initiating an implementation of the optimization policy on the video file, wherein initiating further comprises generating a modified video file based on at least the optimization policy to maximize an aggregated reward calculated based on the one or more positive feedbacks; initiating a validation engine on the modified video file, wherein the validation engine is configured to validate one or more changes implemented on the video file with the one or more user inputs and the optimization policy; and initiating a deployment of the modified video file to the one or more users.

In yet another aspect, a computer program product for generation of data content based on learning reinforcement is presented. The computer program product comprising a non-transitory computer-readable medium comprising code causing a first apparatus to: electronically receive, from a video file repository, a video file demonstrating regulatory compliance requirements for one or more users associated with a resource distribution entity, wherein the video file comprises one or more image frames; transmit control signals configured to cause one or more computing devices of one or more users to display the video file in one or more interactive application environments stored thereon; initiate, via the one or more interactive application environments, a reinforcement learning algorithm on the video file, wherein implementing further comprises electronically receiving, via the one or more interactive application environments, one or more user inputs from the one or more users providing feedback for at least one or more portions of the video file; initiate an optimization policy generation engine on the one or more user inputs to generate an optimization policy, wherein the optimization policy generation engine is configured to encode the one or more user inputs into shaping rewards, wherein encoding further comprises assigning a cost to a first portion of image files associated with one or more negative feedbacks and assigning a reward to a second portion of the image files associated with one or more positive feedbacks, wherein the first portion and the second portion are associated with at least the one or more portions of the video file; initiate an implementation of the optimization policy on the video file, wherein initiating further comprises generating a modified video file based on at least the optimization policy to maximize an aggregated reward calculated based on the one or more positive feedbacks; initiate a validation engine on the modified video file, wherein the validation engine is configured to validate one or more changes implemented on the video file with the one or more user inputs and the optimization policy; and initiate a deployment of the modified video file to the one or more users.

The idea of formulating a fast-forwarding problem using Markov Decision Process (MDP) and developing an FFNet as a reinforcement learning agent, i.e., a Q-learning agent that learns a policy to skip unimportant frames is described in "FFNet: Video Fast-Forwarding via Reinforcement Learning," by Shuyue Lan et al., which is incorporated by reference herein.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
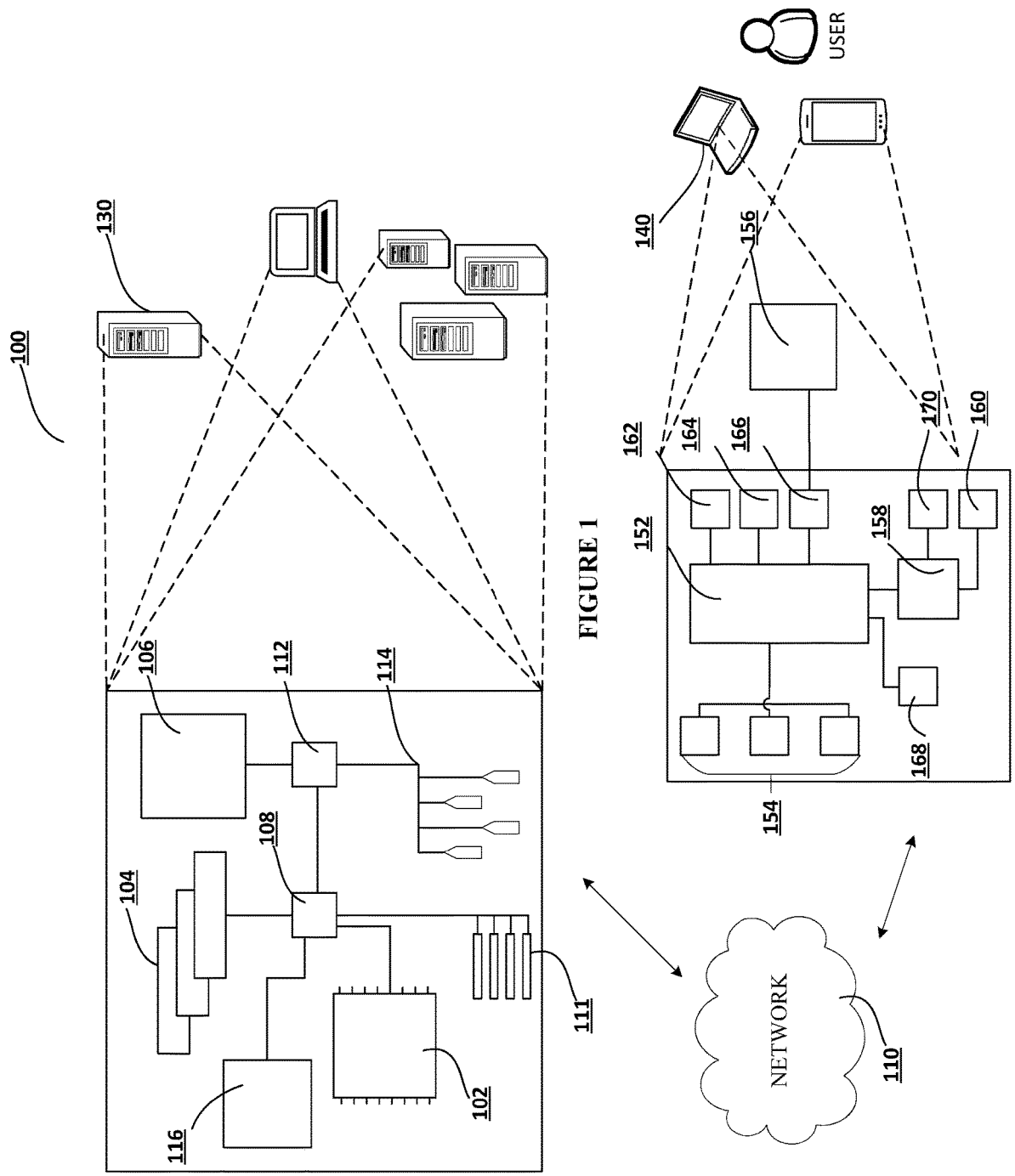
Figure 2:
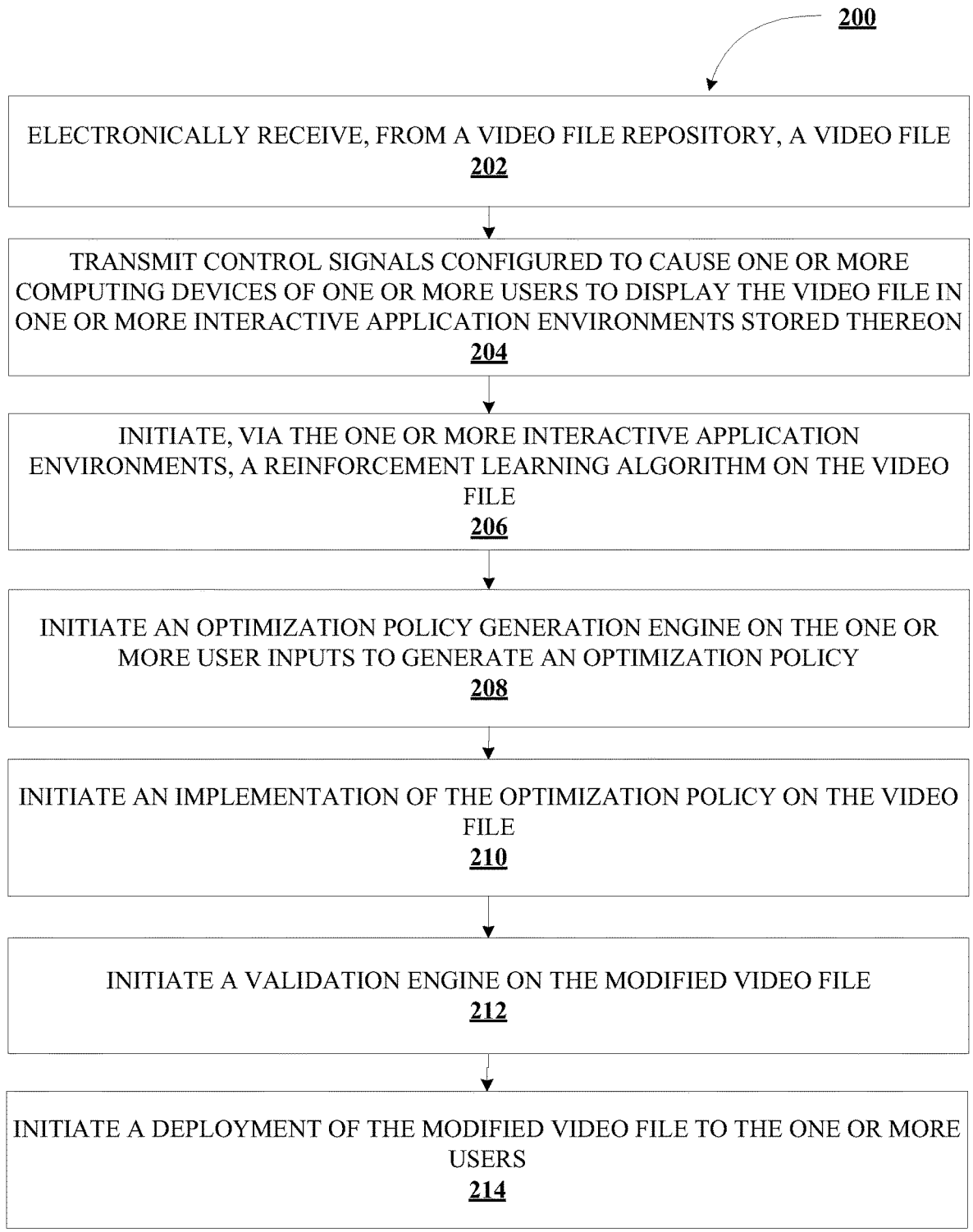
Figure 3:
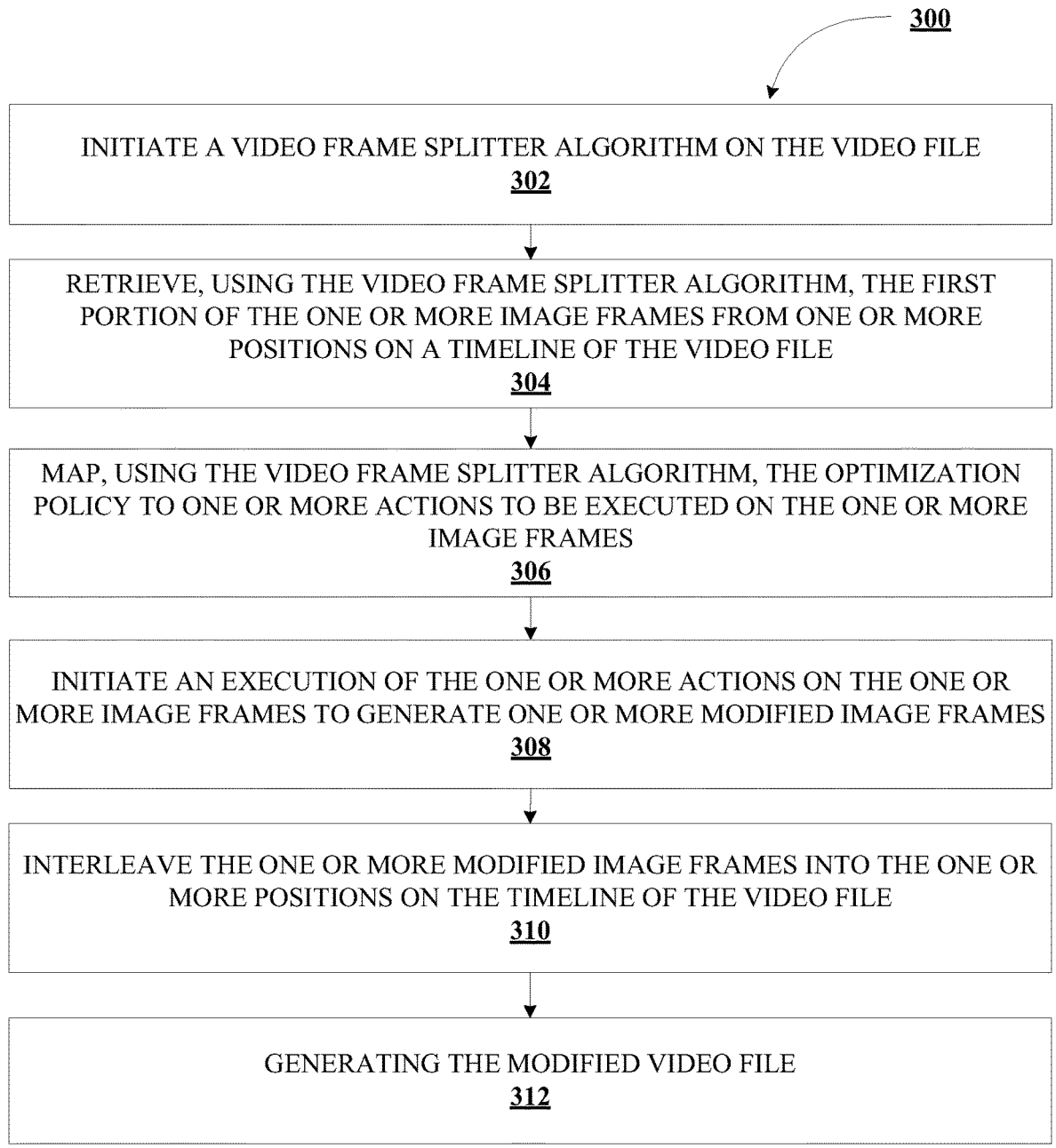

Having thus described embodiments of the invention in general terms, reference will now be made the accompanying drawings, wherein:

FIG. 1 illustrates an exemplary block diagram of the system environment for generation of data content based on learning reinforcement, in accordance with an embodiment of the invention;

FIG. 2 illustrates a process flow for generation of data content based on learning reinforcement, in accordance with an embodiment of the invention; and FIG. 3 illustrates a process flow for interleaving modified image frames into the video file, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" or "resource distribution entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of a computer program, or part of a computer program that serves as a foundation for a larger piece of software and drives the functionality of the software. An engine may be self-contained, but externally-controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

A virtual learning environment (VLE) in educational technology is a Web-based platform for the digital aspects of courses of study, usually within educational institutions. They present resources, activities and interactions within a course structure and provide for the different stages of assessment. VLE's have expanded significantly in recent years. The traditional virtual learning sessions tend to be static in nature and do not have the adaptability and intelligence to convey substantive information based on a user's personal learning need. The present invention uses reinforcement learning (RL) method to train the system to learn automatically how to teach to each user individually based on their performance. By applying artificial intelligence using RL, the present invention identifies efficient teaching strategies by learning action of what, when and how to teach.

FIG. 1 presents an exemplary block diagram of the system environment for generation of data content based on learning reinforcement 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input system 140. Also shown in FIG. 1 is a user of the user input system 140. The user input system 140 may be a mobile device or other non-mobile computing device. The user may be a person who uses the user input system 140 to execute resource transfers using one or more applications stored thereon. The one or more applications may be configured to communicate with the system 130, execute a transaction, input information onto a user interface presented on the user input system 140, or the like. The applications stored on the user input system 140 and the system 130 may incorporate one or more parts of any process flow described herein.

As shown in FIG. 1, the system 130, and the user input system 140 are each operatively and selectively connected to the network 110, which may include one or more separate networks. In addition, the network 110 may include a telecommunication network, local area network (LAN), a wide area network (WAN), and/or a global area network (GAN), such as the Internet. It will also be understood that the network 110 may be secure and/or unsecure and may also include wireless and/or wired and/or optical interconnection technology.

In some embodiments, the system 130 and the user input system 140 may be used to implement the processes described herein, including the mobile-side and server-side processes for installing a computer program from a mobile device to a computer, in accordance with an embodiment of the present invention. The system 130 is intended to represent various forms of digital computers, such as laptops, desktops, workstations, personal digital assistants, servers, blade servers, mainframes, and other appropriate computers. The user input system 140 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application, and allows memory reuse for better utilization of the memory resources when the data sizes are large.

The high-speed interface 1408 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 140 may be made up of multiple computing devices communicating with each other.

FIG. 1 also illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units. Expansion memory may also be provided and connected to user input system 140 through an expansion interface (not shown), which may include, for example, a SIMM (Single In Line Memory Module) card interface. Such expansion memory may provide extra storage space for user input system 140, or may also store applications or other information therein. In some embodiments, expansion memory may include instructions to carry out or supplement the processes described above, and may include secure information also. For example, expansion memory may be provided as a security module for user input system 140, and may be programmed with instructions that permit secure use of user input system 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein. It will be understood that the one or more applications stored in the system 130 and/or the user computing system 140 may interact with one another and may be configured to implement any one or more portions of the various user interfaces and/or process flow described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130. In this regard, the system 130 may be configured to establish a communication link with the user input system 140, whereby the communication link establishes a data channel (wired or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, or the like.

The user input system 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation—and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It will be understood that the embodiment of the system environment illustrated in FIG. 1 is exemplary and that other embodiments may vary. As another example, in some embodiments, the system 130 includes more, less, or different components. As another example, in some embodiments, some or all of the portions of the system environment 100 may be combined into a single portion. Likewise, in some embodiments, some or all of the portions of the system 130 may be separated into two or more distinct portions.

FIG. 2 illustrates a process flow for generation of data content based on learning reinforcement 200, in accordance with an embodiment of the invention. As shown in block 202, the process flow includes electronically receiving, from a video file repository, a video file. Typically, the video file is an electronic medium for the recording, copying, playback, broadcasting, and display of moving visual media. In this regard, the video file may be a collection of image frames configured to transition on a timeline. In some embodiments, the video file may be associated with an educational and/or informational platform. In one aspect, the video file may demonstrate regulatory compliance requirements associated with a resource distribution entity, such as a financial institution.

Next, as shown in block 204, the process flow includes transmitting control signals configured to cause one or more computing devices of one or more users to display the video file in one or more interactive application environments stored thereon. In some embodiments, the system may be configured to electronically receive, from a user module, user characteristics associated with the one or more users. In one aspect, user characteristics may include at least information associated with one or more computing devices of the or more users. In this regard, the system may be configured to receive information associated with technical descriptions of each computing device components and capabilities. In one aspect, the system may be configured to receive processor speed, model, memory capacities, and information associated with network (ethernet or wi-fi) adapters or audio and video capabilities.

In some other embodiments, user characteristics may include information associated with one or more agencies associated with the one or more users, and information associated with regulatory compliance requirements for the one or more agencies. In some embodiments, the one or more agencies may be various departments within a resource distribution entity with specific functions. For example, the one or more agencies may include production, research and development, purchasing, marketing, human resource management, accounting, finance, and/or the like. In some other embodiments, the one or more agencies may be third party entities associated with the resource distribution entity. For example, the third party entities may be outside legal counsel, accounting firm, recruiting firm, and/or the like.

In yet other embodiments, the user characteristics may include information associated with regulatory compliance requirements for the one or more agencies. Within a resource distribution entity, each agency may have independent regulatory and compliance requirements. In some embodiments, the regulatory and compliance requirements for the agencies may overlap with each other. In response to receiving the user characteristics, the system may be configured to categorize the one or more users based on at least the user characteristics.

Next, as shown in block 206, the process flow includes initiating, via the one or more interactive application environments, a reinforcement learning algorithm on the video file. In some embodiments, an interactive application environment may refer to application software configured to accept user input as it is being executed on the computing device of the user. Typically, interactive application environments enable real-time interaction between the user and the application software. In some embodiments, the reinforcement learning algorithm may be associated with a class of algorithms for solving problems modeled as a Markov Decision Process (MDP), a discrete time stochastic control process that provide a modeling decision making in situations where outcomes are partly random and partly under the control of a decision maker. In this regard, the reinforcement learning algorithm may be composed of an agent (e.g., an autonomous entity which acts, directing its activity towards achieving goals), a set of states, and a set of actions per state (e.g., modifying the video file), and an environment (e.g., interactive application environment). Executing an action in a specific state provides the agent with a cost/reward (a numerical score). The goal of the agent is to maximize its total (future) reward. This is achieved by adding the maximum reward attainable from future states to the reward for achieving its current state, effectively influencing the current action by the potential future reward. This potential reward is a weighted sum of the expected values of the rewards of all future steps starting from the current state. In some embodiments, the reinforcement learning algorithm may be independent of the model of the interactive application environment, and it can handle problems with stochastic transitions and rewards without requiring adaptations. Examples of reinforcement learning algorithms may include, but is not limited to, Q-learning, State-Action-Reward-State-Action (SARSA), Deep Q Network (DQN), Deep Deterministic Policy Gradient (DDPG), and/or the like.

Accordingly, the system may be configured to electronically receive, via the one or more interactive application environments, one or more user inputs from the one or more users providing feedback for at least one or more portions of the video file. In some embodiments, the one or more user inputs may include a feedback associated with a quality of the video file. In one aspect, the feedback associated with the quality of the video file may include, but is not limited to a video resolution, a frame rate, an aspect ratio, a video color model and dept, and/or video display parameters such as brightness, contrast, saturation, and/or the like. In some other embodiments, one or more user inputs may include a feedback associated with a substantive content of the video file. In one aspect, the feedback associated with the substantive content of the video file may include at least an indication whether the regulatory compliance requirements demonstrated in the video file are relevant to the one or more agencies associated with the one or more users. In some embodiments, the regulatory compliance requirements may include at least applicable laws, regulations, guidelines, and/or specifications specific to each of the one or more agencies. In yet other embodiments, the one or more user inputs may be recorded user interactions with the one or more interactive application environments. In this regard, the one or more user interaction may include at least rewind, fast-forward, skip, re-watch, sped-up, slowed-down, and/or the like.

Next, as shown in block 208, the process flow includes initiating an optimization policy generation engine one the one or more user inputs to generate an optimization policy. In one aspect, the optimization policy may be defined as the strategy employed to determine the next action based on the current state. In this regard, the optimization policy generation engine may be configured to encode the one or more user inputs into shaping rewards. In one aspect, the system may be configured to initiate a memory module configured to encode the characteristics of user feedback. In this regard, the system may be configured to encode the user inputs by assigning a cost to a first portion of one or more image frames associated with one or more negative feedbacks and assigning a reward to a second portion of the one or more image frames associated with one or more positive feedbacks. For example, assume that the user feedback is associated with the substantive content of the video file, such as, a confidence level associated with the user understanding the content. The user may select specific portions of the video file (a portion of the image frames) and provide feedback indicating that the confidence level associated with the user understanding the content of the specific portions of the video file is greater than a predetermined threshold level. In such cases, the user feedback regarding the user understanding the content is encoded as a reward. On the other hand, if the confidence level associated with the user understanding the content is less than the predetermined threshold level, the user feedback is encoded as a cost. As used herein, the cost and reward may be binary notations and the corresponding ground truth may be represented as a binary semantic vector.

Next, as shown in block 210, the process flow includes initiating an implementation of the optimization policy on the video file. In this regard, the system may be configured to generate a modified video file based on at least the optimization policy to maximize an aggregated reward calculated based on the one or more positive feedbacks. Accordingly, the optimization policy may be configured to determine one or more actions to be executed to modify the video file. Once determined, the system may be configured to select at least one of the one or more actions that maximizes the expected aggregated reward for current and future actions.

Next, as shown in block 212, the process flow includes initiating a validation engine on the modified video file. In some embodiments, the validation engine may be configured to validate one or more changes implemented on the video file with the one or more user inputs and the optimization policy. Next, as shown in block 214, the process flow includes initiating a deployment of the modified video file to the one or more users.

FIG. 3 illustrates a process flow for interleaving modified image frames into the video file 300, in accordance with an embodiment of the invention. As shown in block 302 the process flow includes initiating a video frame splitter algorithm on the video file.

Next, as shown in block 304, the process flow includes retrieving, using the video frame splitter algorithm, the first portion of the one or more image frames from one or more positions on a timeline of the video file. In some embodiments, the video frame splitter algorithm may be configured to split the video file into one or more image frames for processing. In this way, when implementing the optimization policy on the video file, the system may be configured to execute the one or more actions on a specific subset of image frames rather than processing the entire video file. By processing only the subset of image frames, the video frame splitter algorithm may enable the system to be computationally efficient.

Next, as shown in block 306, the process flow includes mapping the optimization policy to one or more actions to be executed on the one or more image frames.

Next, as shown in block 308, the process flow includes initiating an execution of the one or more actions on the one or more image frames to generate one or more modified image frames. In some embodiments, the actions executed on the image frames may include improving a quality of the one or more image frames in the video file, such as a video resolution, a frame rate, an aspect ratio, a video color model and dept, and/or video display parameters such as brightness, contrast, saturation, and/or the like. In some other embodiments, the actions executed on the image frames may include updating a substantive content of the video file such as determining that the regulatory compliance requirements demonstrated in the video file are relevant to the one or more agencies associated with the one or more users.

Next, as shown in block 310, the process flow includes interleaving the one or more modified image frames into the one or more positions on the timeline of the video file. In this regard, the system may be configured to insert the one or more modified image frames into the one or more positions of the original image frames on the timeline of the video. Next, as shown in block 312, the process flow includes generating the modified video file.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for generation of data content based on learning reinforcement, the system comprising:
   at least one non-transitory storage device; and
   at least one processing device coupled to the at least one non-transitory storage device, wherein the at least one processing device is configured to:
   electronically receive, from a video file repository, a video file demonstrating regulatory compliance requirements for one or more users associated with a resource distribution entity, wherein the video file comprises one or more image frames;
   transmit control signals configured to cause one or more computing devices of one or more users to display the video file in one or more interactive application environments stored thereon;
   initiate, via the one or more interactive application environments, a reinforcement learning algorithm on the video file, wherein implementing further comprises electronically receiving, via the one or more interactive application environments, one or more user inputs from the one or more users providing feedback for at least one or more portions of the video file;
   initiate an optimization policy generation engine on the one or more user inputs to generate an optimization policy, wherein the optimization policy generation engine is configured to encode the one or more user inputs into shaping rewards, wherein encoding further comprises assigning a cost to a first portion of one or more image frames associated with one or more negative feedbacks and assigning a reward to a second portion of the one or more image frames associated with one or more positive feedbacks, wherein the first portion and the second portion are associated with at least the one or more portions of the video file;
   initiate an implementation of the optimization policy on the video file, wherein initiating further comprises generating a modified video file based on at least the optimization policy to maximize an aggregated reward calculated based on the one or more positive feedbacks;

initiate a validation engine on the modified video file, wherein the validation engine is configured to validate one or more changes implemented on the video file with the one or more user inputs and the optimization policy; and initiate a deployment of the modified video file to the one or more users.

2. The system of claim 1, wherein the at least one processing device is further configured to:

electronically receive, from a user module, user characteristics associated with the one or more users, wherein the user characteristics comprises at least information associated with one or more computing devices of the or more users, information associated with one or more agencies associated with the one or more users, and information associated with regulatory compliance requirements for the one or more agencies; and categorize the one or more users based on at least the user characteristics.

3. The system of claim 2, wherein the at least one processing device is further configured to:

electronically receive the one or more user inputs from the one or more users providing feedback for the at least one or more portions of the video file, wherein the one or more user inputs comprises a feedback associated with a quality of the video file and a feedback associated with a substantive content of the video file.

4. The system of claim 3, wherein the feedback associated with the quality of the video file comprises at least a video resolution, a frame rate, an aspect ratio, video color model and depth, and/or video display parameters.

5. The system of claim 3, wherein the feedback associated with the substantive content of the video file comprises at least an indication whether the regulatory compliance requirements demonstrated in the video file are relevant to the one or more agencies associated with the one or more users, wherein the regulatory compliance requirements comprises at least applicable laws, regulations, guidelines, and/or specifications specific to each of the one or more agencies.

6. The system of claim 1, wherein the at least one processing device is further configured to:

electronically record, via the one or more interactive application environments, one or more user interactions with the video file, wherein the one or more user interactions comprises at least rewind, fast-forward, skip, re-watch, sped-up, slowed-down, and/or the like.

7. The system of claim 6, wherein the at least one processing device is further configured to initiate an implementation of the optimization policy on the video file, wherein initiating further comprises:

initiating a video frame splitter algorithm on the video file;

retrieving, using the video frame splitter algorithm, the first portion of the one or more image frames from one or more positions on a timeline of the video file;

mapping the optimization policy to one or more actions to be executed on the one or more image frames;

initiating an execution of the one or more actions on the one or more image frames to generate one or more modified image frames;

interleaving the one or more modified image frames into the one or more positions on the timeline of the video file; and generating the modified video file based on at least interleaving the one or more modified image frames into the one or more positions on the timeline of the video file.

8. A method for generation of data content based on learning reinforcement, the method comprising:

electronically receiving, from a video file repository, a video file demonstrating regulatory compliance requirements for one or more users associated with a resource distribution entity, wherein the video file comprises one or more image frames;

transmitting control signals configured to cause one or more computing devices of one or more users to display the video file in one or more interactive application environments stored thereon;

initiating, via the one or more interactive application environments, a reinforcement learning algorithm on the video file, wherein implementing further comprises electronically receiving, via the one or more interactive application environments, one or more user inputs from the one or more users providing feedback for at least one or more portions of the video file;

initiating an optimization policy generation engine on the one or more user inputs to generate an optimization policy, wherein the optimization policy generation engine is configured to encode the one or more user inputs into shaping rewards, wherein encoding further comprises assigning a cost to a first portion of one or more image frames associated with one or more negative feedbacks and assigning a reward to a second portion of the one or more image frames associated with one or more positive feedbacks, wherein the first portion and the second portion are associated with at least the one or more portions of the video file;

initiating an implementation of the optimization policy on the video file, wherein initiating further comprises generating a modified video file based on at least the optimization policy to maximize an aggregated reward calculated based on the one or more positive feedbacks;

initiating a validation engine on the modified video file, wherein the validation engine is configured to validate one or more changes implemented on the video file with the one or more user inputs and the optimization policy; and initiating a deployment of the modified video file to the one or more users.

9. The method of claim 8, wherein the method further comprises:

electronically receiving, from a user module, user characteristics associated with the one or more users, wherein the user characteristics comprises at least information associated with one or more computing devices of the or more users, information associated with one or more agencies associated with the one or more users, and information associated with regulatory compliance requirements for the one or more agencies; and categorizing the one or more users based on at least the user characteristics.

10. The method of claim 9, wherein the method further comprises:

electronically receiving the one or more user inputs from the one or more users providing feedback for the at least one or more portions of the video file, wherein the one or more user inputs comprises a feedback associated with a quality of the video file and a feedback associated with a substantive content of the video file.

11. The method of claim 10, wherein the feedback associated with the quality of the video file comprises at least a video resolution, a frame rate, an aspect ratio, video color model and depth, and/or video display parameters.

12. The method of claim 10, wherein the feedback associated with the substantive content of the video file comprises at least an indication whether the regulatory compliance requirements demonstrated in the video file are relevant to the one or more agencies associated with the one or more users, wherein the regulatory compliance requirements comprises at least applicable laws, regulations, guidelines, and/or specifications specific to each of the one or more agencies.

13. The method of claim 8, wherein the method further comprises:
    electronically recording, via the one or more interactive application environments, one or more user interactions with the video file, wherein the one or more user interactions comprises at least rewind, fast-forward, skip, re-watch, sped-up, slowed-down, and/or the like.

14. The method of claim 13, wherein the method further comprises initiating an implementation of the optimization policy on the video file, wherein initiating further comprises:
    initiating a video frame splitter algorithm on the video file;
    retrieving, using the video frame splitter algorithm, the first portion of the one or more image frames from one or more positions on a timeline of the video file;
    mapping the optimization policy to one or more actions to be executed on the one or more image frames;
    initiating an execution of the one or more actions on the one or more image frames to generate one or more modified image frames;
    interleaving the one or more modified image frames into the one or more positions on the timeline of the video file; and
    generating the modified video file based on at least interleaving the one or more modified image frames into the one or more positions on the timeline of the video file.

15. A computer program product for generation of data content based on learning reinforcement, the computer program product comprising a non-transitory computer-readable medium comprising code causing a first apparatus to:
    electronically receive, from a video file repository, a video file demonstrating regulatory compliance requirements for one or more users associated with a resource distribution entity, wherein the video file comprises one or more image frames;
    transmit control signals configured to cause one or more computing devices of one or more users to display the video file in one or more interactive application environments stored thereon;
    initiate, via the one or more interactive application environments, a reinforcement learning algorithm on the video file, wherein implementing further comprises electronically receiving, via the one or more interactive application environments, one or more user inputs from the one or more users providing feedback for at least one or more portions of the video file;
    initiate an optimization policy generation engine on the one or more user inputs to generate an optimization policy, wherein the optimization policy generation engine is configured to encode the one or more user inputs into shaping rewards, wherein encoding further comprises assigning a cost to a first portion of image files associated with one or more negative feedbacks and assigning a reward to a second portion of the image files associated with one or more positive feedbacks, wherein the first portion and the second portion are associated with at least the one or more portions of the video file;
    initiate an implementation of the optimization policy on the video file, wherein initiating further comprises generating a modified video file based on at least the optimization policy to maximize an aggregated reward calculated based on the one or more positive feedbacks;
    initiate a validation engine on the modified video file, wherein the validation engine is configured to validate one or more changes implemented on the video file with the one or more user inputs and the optimization policy; and
    initiate a deployment of the modified video file to the one or more users.

16. The computer program product of claim 15, wherein the first apparatus is further configured to:
    electronically receive, from a user module, user characteristics associated with the one or more users, wherein the user characteristics comprises at least information associated with one or more computing devices of the or more users, information associated with one or more agencies associated with the one or more users, and information associated with regulatory compliance requirements for the one or more agencies; and
    categorize the one or more users based on at least the user characteristics.

17. The computer program product of claim 16, wherein the first apparatus is further configured to:
    electronically receive the one or more user inputs from the one or more users providing feedback for the at least one or more portions of the video file, wherein the one or more user inputs comprises a feedback associated with a quality of the video file and a feedback associated with a substantive content of the video file.

18. The computer program product of claim 17, wherein the feedback associated with the quality of the video file comprises at least a video resolution, a frame rate, an aspect ratio, video color model and depth, and/or video display parameters.

19. The computer program product of claim 17, wherein the feedback associated with the substantive content of the video file comprises at least an indication whether the regulatory compliance requirements demonstrated in the video file are relevant to the one or more agencies associated with the one or more users, wherein the regulatory compliance requirements comprises at least applicable laws, regulations, guidelines, and/or specifications specific to each of the one or more agencies.

20. The computer program product of claim 15, wherein the first apparatus is further configured to:
    electronically record, via the one or more interactive application environments, one or more user interactions with the video file, wherein the one or more user interactions comprises at least rewind, fast-forward, skip, re-watch, sped-up, slowed-down, and/or the like.

* * * * *